May 31, 1938. F. W. SCHMIDT ET AL 2,119,028
VEHICLE JACKING STRUCTURE
Filed June 10, 1935 2 Sheets-Sheet 1

Inventor
Creighton W. Ryerson
Frank W. Schmidt
By Beaman & Langford
Attorneys

May 31, 1938.    F. W. SCHMIDT ET AL    2,119,028
VEHICLE JACKING STRUCTURE
Filed June 10, 1935    2 Sheets-Sheet 2

Inventor
Creighton W. Ryerson
Frank W. Schmidt

By Beaman & Langford
Attorney

Patented May 31, 1938

2,119,028

UNITED STATES PATENT OFFICE 2,119,028

VEHICLE JACKING STRUCTURE

Frank W. Schmidt and Creighton W. Ryerson, Jackson, Mich., assignors to Ryerson & Haynes, Inc., Jackson, Mich., a corporation of Michigan Application June 10, 1935, Serial No. 25,826

9 Claims. (Cl. 254—133)

The present invention relates to improvements in jacking structure and has particular reference to jacking structures for automotive vehicles.

The invention is of the general type disclosed in the patent to Stephen DeOrlow, 1,994,984, and resides particularly in the details of construction. The jack disclosed in the above patent and application is arranged for lifting a sprung portion of a vehicle by bearing against the bumper structure or against a special bracket secured to or near the bumper structure so that the jack does not have to be placed beneath the vehicle where it is difficult to manipulate.

In the present invention the jack is constructed entirely of sheet metal, is of the ratchet type, and has an operating lever arranged to extend upwardly between the vehicle and the bumper.

Accordingly, an object of the invention is to provide a jack having a vertical operating lever arranged to extend between the bumper and the vehicle body.

Another object of the invention is to provide a jack of sheet metal and having means for connecting the vertically movable portion thereof to the sprung portion of a vehicle.

Another object of the invention is to provide a ratchet vehicle jack having a lifting pawl and a holding pawl wherein the operating lever is pivoted closer to the vertical axis of the jack than the lifting pawl.

Other objects of the invention reside in the specific construction of, and the relation between, the thrust bar and the sheet metal body movable on the thrust bar.

Figure 1:
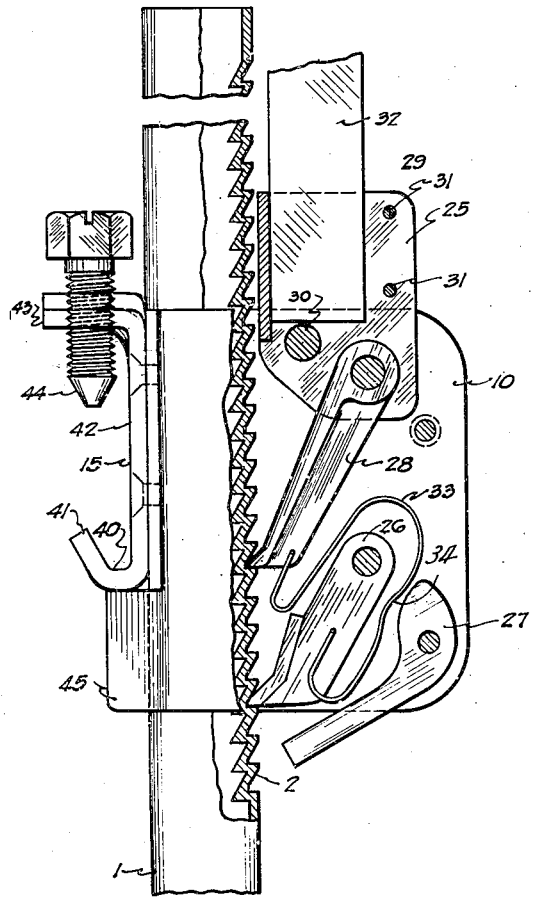
Figure 2:
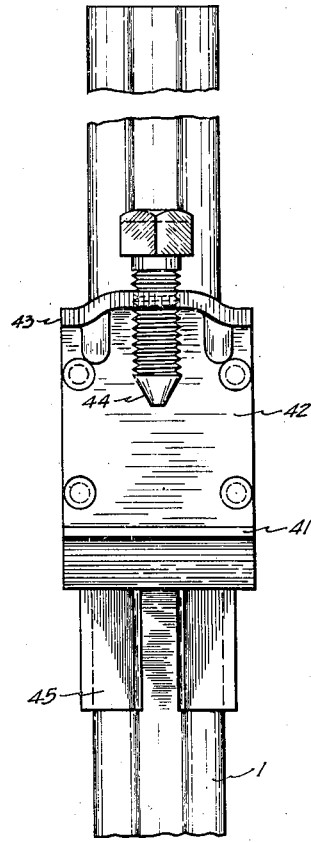
Figure 3:
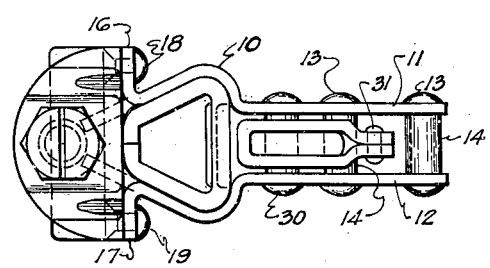
Figure 4:
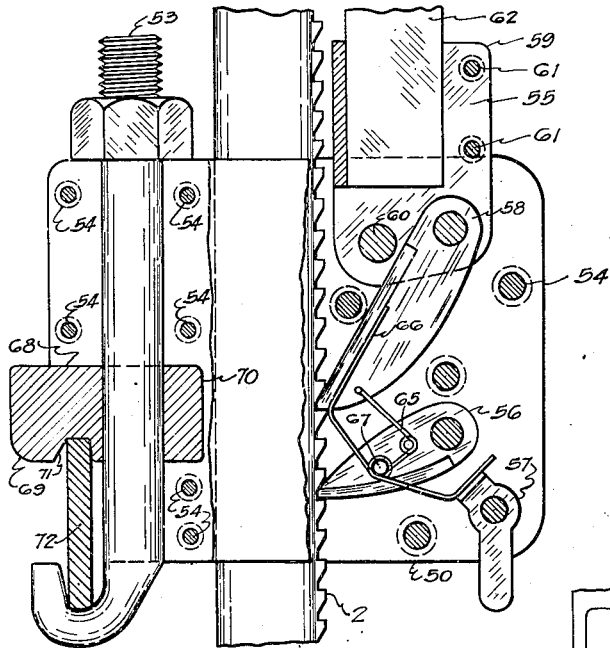
Figure 5:
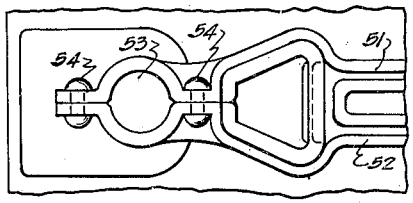
Figure 6:
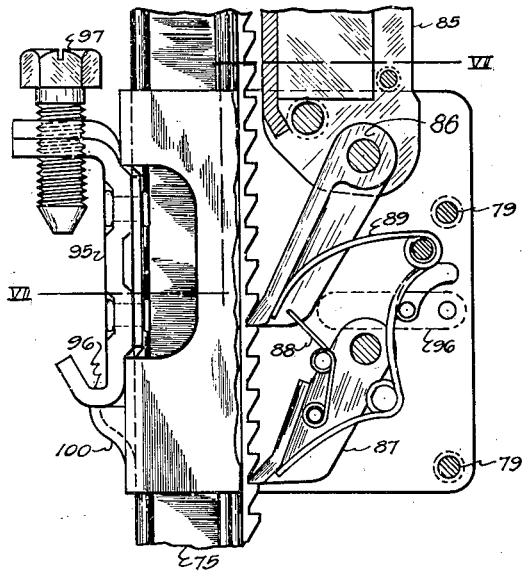
Figure 7:
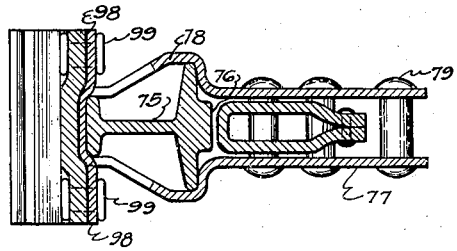

These and other objects will be apparent from the following specification when taken with the accompanying drawings, in which Fig. 1 is a broken side elevation of one form of the invention partly shown in cross section, Fig. 2 is a broken fragmentary front elevation of the jack construction shown in Fig. 1, Fig. 3 is a plan view of the jack construction shown in Fig. 1, Fig. 4 is a view similar to Fig. 1, showing a modified form of the invention, Fig. 5 is a fragmentary plan view of the jack construction shown in Fig. 4, with the clamping bolt removed, Fig. 6 is a view similar to Fig. 1 of a further modified form of the invention, and Fig. 7 is a cross sectional view taken on line VII—VII of Fig. 6.

Referring particularly to Figs. 1, 2, and 3 of the drawings disclosing an embodiment of the invention, the reference character 1 indicates a thrust bar or supporting column of sheet metal of trapezoidal cross section having ratchet teeth 2 therein, as more fully disclosed in my copending application Serial No. 27,851 filed June 22, 1935, patented May 19, 1936, as patent 2,041,376. The lower end of the thrust bar 1 is provided with a press fitted shoe 3 having a lower convex portion 4 and seated on the concave seat 5 of the base 6. The convex portion 4 and the concave seat 5 are provided with openings 7 and 8, respectively, through which extends a spring clip 9 for resiliently maintaining the thrust bar 1 seated on the base 6. The opening 8 is somewhat larger than the normal width of the spring clip 9 at its mid-section, so as not to interfere with the ball and socket action between the thrust bar 1 and the base 6.

The thrust bar 1 has slidably mounted thereon a housing 10, comprising two sheet metallic plates 11 and 12, respectively, in part maintained in spaced relation by shoulder rivets 13 having spacing body portions 14. To one side of the thrust bar 1 the plates 11 and 12, comprising the housing 10, are in parallel relationship and have actuating mechanism mounted therebetween. The slideway in the housing 10 for slidably receiving the thrust bar 1 is formed by bending the sheet metallic plates 11 and 12 adjacent one end thereof, respectively, outwardly and then diagonally inwardly to form a channel concentric with and snugly surrounding the thrust bar 1, as shown particularly in Fig. 3.

The attachment portion 15 is riveted, or otherwise suitably received, to portions 16 and 17 of the plates 11 and 12, respectively, flared outwardly into alignment, at the outer end of the thrust bar 1 slideway, by rivets 18 and 19.

The actuating mechanism for moving the body 10 up and down the thrust bar 1 comprises the actuating lever 25, the holding pawl 26 and the reversing lever 27 pivoted to the plates 11 and 12, and the lifting pawl 28 pivoted to the actuating lever 25. The actuating lever 25 comprises a sheet metallic base portion 29 pivoted about the rivet 30. The base portion 29 is bent into an enclosed loop maintained closed by rivets 31. A removable hand portion 32 is removably positioned within the loop formed by the base 29 and is manually oscillated for operation of the jack. The lever 25 and hand portion 32 extend vertically, the hand portion 32 being arranged so that when the jack is secured to a sprung portion of a vehicle, it extends between the vehicle bumper and the body. The lifting pawl 28 pivot is, when the pawl 28 is in its uppermost position relative to the body 10, spaced further from the thrust bar 2 than the actuating lever 25. A spring 33 having a recess 34 for receiving the reversing lever 27 connects the lifting pawl 28 with the holding pawl 26 to provide an operative connection therebetween. The actuating mechanism is operated in a manner well known, as disclosed, for example, in the patent to Hindman No. 1,093,269.

The attachment portion 15 is formed of a sheet metallic plate having a lower ledge 40, a shoulder 42, and an extension 43 overhanging the ledge 40. A clamping screw 44 is threaded in the extension 43. The attachment portion 15 is designed to receive the bumper bracket or other suitable bracket secured to the sprung portion of a vehicle. The bumper bracket or other bracket rests on the ledge 40 and is clamped against the shoulder 42 by the screw 44. The shoulder 42 of the attachment portion 15 constitutes one side of the slideway for receiving the thrust bar 1 and maintains the sides of the slideway in fixed spaced relation. Lower portions 45 of the plates 11 and 12 extending beyond the slideway for the thrust bar 1 provide rests for the attachment portion 15, as shown particularly in Figs. 1 and 3.

Referring particularly to Figs. 4 and 5, another embodiment of the invention is shown. The thrust bar 1 is the same as that disclosed in Figs. 1, 2, and 3. The housing 50, however, is different. It comprises similarly formed but oppositely arranged halves 51 and 52. The halves 51 and 52 are of sheet metal and are preferably given their desired configuration by stamping. The housing 50 comprises three main sections, one for receiving the actuating mechanism, another for slidably receiving the thrust bar 1, and a third for slidably receiving a hooked bolt 53 for securing the housing 50 to the sprung portion of a vehicle. The halves 51 and 52 of the body 50 are secured together by rivets 54.

The actuating mechanism for moving the body 50 up and down the thrust bar 1 comprises the actuating lever 55, the holding pawl 56, and the reversing lever 57 pivoted to the halves 51 and 52, and the lifting pawl pivoted to the actuating lever 55. The actuating lever 55 is similar to the actuating lever 25 of Fig. 1 and comprises the sheet metallic base portion 59 pivoted on the rivet 60. The base portion 59 is bent into an enclosed loop and maintained closed by the rivets 61. A hand portion 62 is removably positioned within the loop formed by the base 59. A spring 65 connects the lifting pawl 58 to the holding pawl 56 to provide an operative connection therebetween. An additional spring 66 is provided which bears against the lifting pawl 58 and is loosely pivoted about the pin 67 on the holding pawl 56.

The actuating mechanism is operated in a manner well known and similar to that disclosed in Fig. 1. The difference between the structure of the actuating mechanism of Fig. 1 and that of Fig. 4 resides in the provision of two springs in the Fig. 4 construction and only one spring in the Fig. 1 construction. As above disclosed, the spring 33 of the Fig. 1 construction acts alternately in tension and compression to control the movement of the lifting and holding pawls into and out of engagement with the ratchet teeth 2 during the lowering operation. The same spring is engaged by the reversing lever for maintaining the lifting pawl 28 and the holding pawl 26 into operative engagement with the ratchet teeth during the lifting operation. In the Fig. 4 construction the spring 66, pivoted about the pin 67, is engaged by the reversing lever 57 to maintain the lifting pawl 58 and the holding pawl 56 in operative relation to the ratchet teeth 2 during the lifting operation. The spring 65 operates alternately in tension and compression to control the movement of the lifting pawl 58 and the holding pawl 56 into and out of engagement with the ratchet teeth 2 during the lowering operation. With this explanation of the functions of the spring 66 and the spring 65, the operation of the actuating mechanism disclosed in the embodiment of Fig. 4 will be obvious from the operation of the actuating mechanism disclosed in Fig. 1. The attachment portion 68 comprises, in addition to the hooked bolt 53, a block 69 seated in a recess 70 cut in the plates 51 and 52 through the slideway into which the bolt 53 is fitted. The block is maintained in the recess 70 by the bolt 53. An inverted channel 71 is provided for receiving the upper edge of a bar 72 of the bumper structure or other jack attaching structure on the sprung portion of the vehicle. The lower edge of the bar 72 is engaged by the hooked bolt 53, which is arranged to draw, by the action of the nut 73, the bar 72 into the channel 71, thus clamping the bar 72 to the housing 50 to lift the sprung portion of the vehicle when the housing 50 is lifted by the actuating mechanism.

In Figs. 6 and 7 another embodiment of the invention is shown. The thrust bar 75 of general I-shaped cross-section is provided on the outer side of one flange with ratchet teeth 76. A slideway 78 is formed at the inner end of the housing 77 and is shaped to snugly and slidably receive the thrust bar 75. Adjacent the slideway 78 the sides of the housing are disposed in spaced parallel relation and so maintained by the shoulder rivets 79. Actuating mechanism comprised by the actuating lever 85, the lifting pawl 86 pivoted thereto, the holding pawl 87, the operating springs 88 and 89 corresponding to the operating springs 65 and 66 of Fig. 4, and the reversing lever 90 is disposed within the parallel sided portion of the housing 77. The operation of the actuating mechanism and the functioning of its component parts will be obvious from the discussion of the other embodiments of the invention.

An attachment portion 95 is provided for securing the jack to a sprung portion of a vehicle. The attachment portion is of sheet metal, is similar to that shown in Fig. 1, and comprises a ledge 96 and a clamping screw 97 overhanging the ledge 96. Ears 98 are lanced out of the slideway 78 and have the attachment portion 95 secured thereto by rivets 99, or in some other suitable manner, such as welding. A support 100 is stuck out of the slideway 78 below the attachment portion 95 for vertically supporting it.

It will be apparent from the foregoing specification that numerous details of the invention are not important and we therefore do not wish to be limited except by the scope of the following claims.

We claim:

1. A vehicle jack, comprising a substantially vertical toothed supporting bar, a body relatively slidable on said bar, ratchet mechanism mounted in said body, an actuating lever for operating said mechanism, said lever being pivoted to said body adjacent said bar, a holding pawl comprising a portion of said ratchet mechanism pivoted in said body, and a lifting pawl comprising a portion of said ratchet mechanism pivoted to said lever at a point, when said pawl is in its uppermost position relative to said body, horizontally spaced a greater distance from said bar than the point at which said lever is pivoted and vertically spaced below the horizontal plane of the lever, said lever extending substantially directly upward and operable into and out of a substantially vertical position.

2. In a jack having a supporting bar, a body comprising oppositely disposed sheet metal plates, a housing defined by said plates at one side thereof having actuating mechanism therein, means at the other side of said body for receiving the object to be lifted, opposed outwardly extending channels defined by said plates intermediate said housing and said object receiving means, said channels defining a slideway for receiving said bar, and oppositely extending ears on said slideway to which said object receiving means is secured.

3. In a jack having a supporting bar, a body comprising spaced oppositely disposed sheet metal portions, means to maintain said portions in fixed spaced relation to define the actuating mechanism housing, means solely defined by said portions adjacent said housing for slidably receiving said bar, means adjacent said last named means for receiving the object to be lifted, and flanges defined by said portions adjacent said bar receiving means to which said object receiving means is secured, said flanges extending outwardly from the sides of said portions.

4. A vehicle jack comprising a toothed thrust bar, a base therefor, a body relatively slidable on said thrust bar, an actuating lever pivoted in said body adjacent said thrust bar, a lifting pawl pivoted to said actuating lever at a point when it is in its uppermost position relative to said body, spaced from said thrust bar a distance greater than that at which said lever is pivoted, a holding pawl, means associated with said holding pawl and lifting pawl for controlling the operation of said pawls, and means secured to said body for receiving the object to be lifted, said lever extending substantially directly upward and operable into and out of a substantially vertical position.

5. A vehicle jack having a supporting bar, a load supporting body associated with said bar, and means connected to said body for clamping the body to a vehicle part, said means comprising a clamping face fixed relatively to said body, and a hooked bolt slidably mounted in said body for movement relatively to said clamping face.

6. A ratchet jack comprising a supporting bar of tubular sheet metal having a vertical face with teeth defined therein and other vertical faces in opposed relation diverging toward said vertical face with teeth, a housing defined by sheet metal portions in spaced relation closely embracing the diverging faces of said bar, said vertical face having the teeth therein opening into and being confined by a space defined by said spaced sheet metal portions, said opposed vertical faces constituting guiding surfaces for said housing, and actuating mechanism located within said housing and engaging with said teeth.

7. In a jack having a supporting bar, a body comprising a return bent sheet metal plate defining at the inner end thereof a slideway for receiving said bar, and adjacent the slideway a housing for receiving the actuating mechanism for relative movement between said housing and bar, at least one tab struck out from said slideway and an attachment portion supported from said tab for supporting a vehicle part.

8. A vehicle jack having a supporting bar, a load supporting body mounted on said bar for positive movement vertically therealong, and means fixedly connected to said body for rigidly clamping the same on a vehicle part, said means comprising a clamping face fixed relatively to said body, and clamping means movable relatively to said body in which to suspend the vehicle part, said clamping face and means being arranged for clamping the vehicle therebetween.

9. A bumper jack of the ratchet type designed to be applied to the bumper structure of an automobile and to be operated in the restricted space between the body of the automobile and the bumper bar, including a supporting column, a bumper structure receiving body movable up and down said column, mechanism to move said body, and a lever to actuate said mechanism, said lever being adjacent said supporting column and being characterized by the fact that it is so arranged with respect to the remainder of the jack structure that it is oscillatable into and out of a position substantially parallel to said supporting column to actuate said mechanism, whereby with the jack in supporting relation to an automobile bumper structure the supporting column and actuating lever may project upwardly through the space between the automobile body and the bumper bar thereof and the actuating lever may be operated without hinderance from the automobile or the bumper structure.

CREIGHTON W. RYERSON.
FRANK W. SCHMIDT.